United States Patent [19]
Celi, Jr. et al.

[11] Patent Number: 6,157,933
[45] Date of Patent: Dec. 5, 2000

[54] METHOD AND APPARATUS FOR LOADING MULTIPLE ANIMATED IMAGES ON A WEB-PAGE WITH LIMITED NETWORK THROUGHPUT

[75] Inventors: Joseph Celi, Jr., Boynton Beach; Wendi Lynn Nusbickel, Delray Beach; Glen Robert Walters, Sebring; Victor Stuart Moore, Boynton Beach, all of Fla.

[73] Assignee: International Business Machines Corporation, Armonk, N.Y.

[21] Appl. No.: 08/979,039

[22] Filed: Nov. 26, 1997

[51] Int. Cl.⁷ ........................................ G06F 3/14
[52] U.S. Cl. ........................ 707/501; 707/513; 345/473
[58] Field of Search .................... 707/501, 513, 707/526; 345/473, 474, 475

[56] References Cited

U.S. PATENT DOCUMENTS

| | | | |
|---|---|---|---|
| 5,465,121 | 11/1995 | Blalock et al. | 348/744 |
| 5,572,643 | 11/1996 | Judson | 709/218 |
| 5,636,340 | 6/1997 | Bonneau et al. | 707/500 |
| 5,675,752 | 10/1997 | Scott et al. | 345/333 |
| 5,680,535 | 10/1997 | Harbin et al. | 345/473 |
| 5,737,619 | 4/1998 | Judson | 707/500 |
| 5,742,768 | 4/1998 | Gennaro et al. | 1/1 |
| 5,781,227 | 7/1998 | Goode et al. | 348/7 |
| 5,913,040 | 6/1999 | Rakavy et al. | 709/232 |
| 5,966,162 | 10/1999 | Goode et al. | 348/10 |
| 5,996,007 | 11/1999 | Klug et al. | 709/218 |
| 6,009,429 | 12/1999 | Greer et al. | 707/10 |
| 6,011,537 | 1/2000 | Slotznick | 345/115 |
| 6,049,342 | 4/2000 | Nielsen et al. | 345/473 |

OTHER PUBLICATIONS

Chandak, Web Programming with Microsoft Tools 6–in–1, Macmillan Comp. Pbsr., pp. 479–484, Aug. 5, 1997.

Gulbransen, Creating Web Applets with Java, Macmillan Comp. Pbsr., Ch. 2, Apr. 29, 1996.

*Primary Examiner*—Stephen S. Hong
*Assistant Examiner*—Cesar B. Paula
*Attorney, Agent, or Firm*—Fleit, Kain, Gibbons, Gutman & Bongini P.L.; Jon A. Gibbons

[57] ABSTRACT

A method and apparatus for loading multiple animated images on a Web page during browsing over a network with limited bandwidth. The method comprising the steps of: (1) retrieving hypertext objects containing a Java applet from servers over a network into a browser utilizing a Java engine for running Java applets; (2) displaying a default image and default image effects by the Java applet; and (3) the Java applet retrieving a target image series comprising a series of related images from the server and loading the target image series one image at a time with screen transition effects in between each image so that a speed of the screen transition effects is set to finish when a next image in the image series is retrieved over the network of limited bandwidth and prepared for loading by said Java applet, thereby making the speed of the screen transition effects proportional to a time required to retrieved the next image in the image series.

In another embodiment, an apparatus and computer readable medium carries out the method above.

15 Claims, 6 Drawing Sheets

METHOD AND APPARATUS FOR LOADING MULTIPLE ANIMATED IMAGES ON A WEB-PAGE WITH LIMITED NETWORK THROUGHPUT

FIELD OF THE INVENTION

The present invention relates generally to computer networks and more particularly to methods and apparatus for enhancing the operation of Internet browsers.

BACKGROUND OF THE INVENTION

The World-Wide-Web ("Web") has become immensely popular largely because of the ease of finding information and the user-friendliness of today's browsers. A feature known as hypertext allows a user to access information from one Web page to another by simply pointing (using a pointing device such as a mouse) at the hypertext and clicking. Another feature that makes the Web attractive is having the ability to process the information (or content) in remote Web pages without the requirement of having a specialized application program for each kind of content accessed. Thus, the same content is viewed across different platforms. Browser technology has evolved to enable running of applications that manipulate this content across platforms.

The Web relies on an application protocol called HTML (Hyper Text Mark Up Language) which is an interpretative scripting language for rendering text, graphics, images, audio, real-time video, etc. on a Web compliant browser. HTML is independent of client operating systems. So HTML renders the same content across a wide variety of software and hardware operating platforms. Software platforms include Windows 3.1, Windows NT, Apple's Copeland and Macintosh, and IBM's AIX and OS/2, HP Unix, etc. Popular compliant WebBrowser includes Microsoft's Internet Explorer, Netscape Navigator, Lynx and Mosaic.

HTML interprets links to files, images, sound clips, etc. through the use of hypertext links. Upon user invocation of a hypertext link to a Web page, the browser initiates a network request to receive the desired Web page. The selected Web page is loaded according to its HTML script formatting. HTML loads the whole Web page at once. Most client Web browsers provide some type of user feedback on the status of the loading completion. The feedback can be accomplished through status bars and other animated graphics. There is a finite amount of loading time dependent on factors such as the network bandwidth, network congestion and the amount of Web page graphics to be loaded. It is common for Web pages containing several images to take 30 to 60 seconds to load. The user must wait until the image is completely loaded if they want to view the entire Web page.

During the loading interval, the browser usually places text information up first and provides a generic default icon or grey box on the areas for images to be loaded. Web page providers typically design their respective Web pages to load attribution data such as trademarks first, followed by advertisement, text and finally images and related graphics. This load time is even more observable on newer Web pages and client browsers that support multiple frames or windows on a Web page. The reality in the transmission of HTML is that text and related graphics are competing for the same network bandwidth and their is a need to provide Web pages to display graphics information and text quickly.

U.S. Pat. No. 5,572,643 issued Nov. 5, 1996 to Judson for "Web Browser with Dynamic Display of Information Object During Linking" discloses a browser that displays an informational message stored on the client's system while downloading a hypertext document.

Thus, a need exists for a method to load multiple animated images on a Web page during browsing over a network with a limited throughput.

SUMMARY OF THE INVENTION

Briefly in accordance with the present invention, a method and apparatus is disclosed for loading multiple animated images on a Web page during browsing over a network with limited bandwidth comprising the steps of: (1) retrieving hypertext objects containing a Java applet from servers over a network into a browser utilizing a Java engine for running Java applets; (2) displaying a default image and default image effects by the Java applet; and (3) the Java applet retrieving a target image series comprising a series of related images from the server and loading the target image series one image at a time with screen effects in between each image responsive to further retrieving of next image in the image series.

BRIEF DESCRIPTION OF THE DRAWING(S)

DESCRIPTION OF A PREFERRED EMBODIMENT

Figure 1:
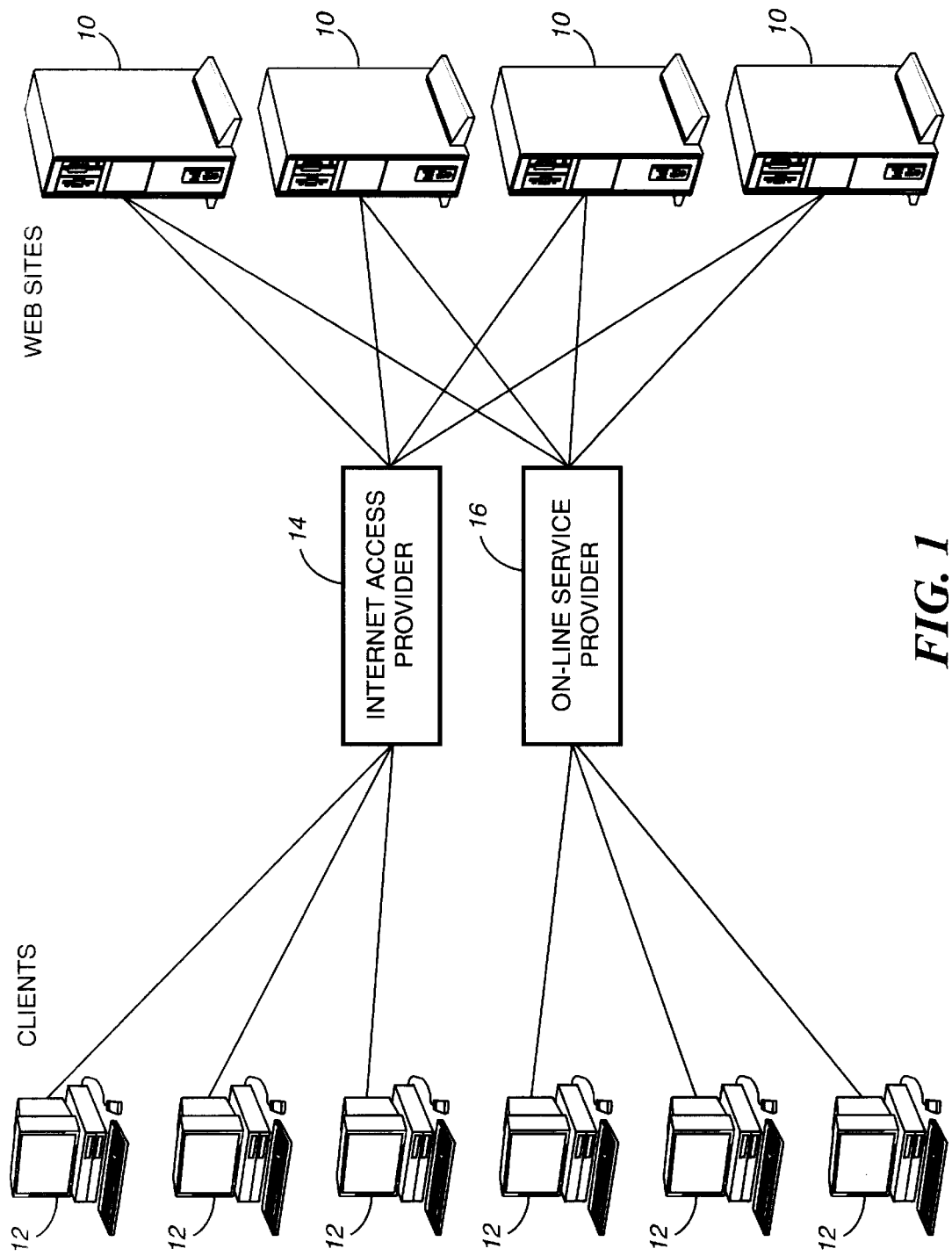
FIG. 1 is a functional block diagram of a computer network in which the present invention is implemented.

FIG. 1 illustrates a functional diagram of a computer network for World Wide Web access from a plurality of computer clients 12 to a plurality of Web sites 10. Access to Web sites 10 can be accomplished directly through a local Internet Service Provider 14, often referred to as ISPs. Or through an on-line service 16 provider like CompuServe, Prodigy, American Online, etc.

Figure 2:
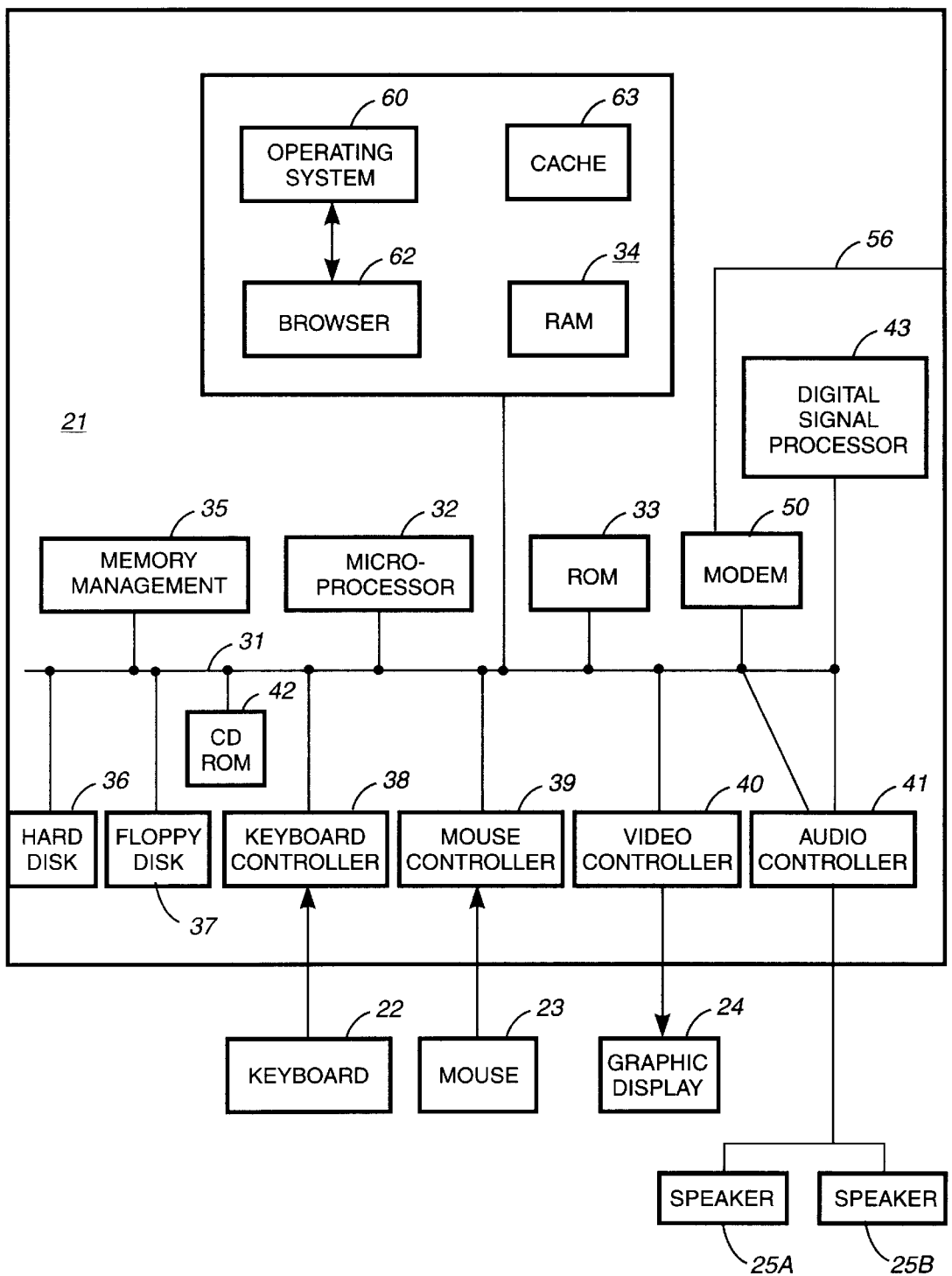
FIG. 2 is a block diagram of an informational processing system supporting a compliant HTML World Wide Web browser.

Computer clients 12 are informational processing system capable of running an HTML compliant Web browser such as Microsoft's Internet Explorer, Netscape Navigator, Lynx and Mosaic. FIG. 2 depicts a typical block diagram of a personal computer with an operating system 60 running a Web browser 62. The exact hardware configuration of computer clients 10, the brand of operating system 62 or the brand of Web browser configuration is unimportant to understand this present invention. And those skilled in the art can conclude that any HTML (Hyper Text Markup Language) compatible Web browser capable of running Sun Microsystems's Java engine is within the true spirit of this invention and scope of the claims.

Figure 3:
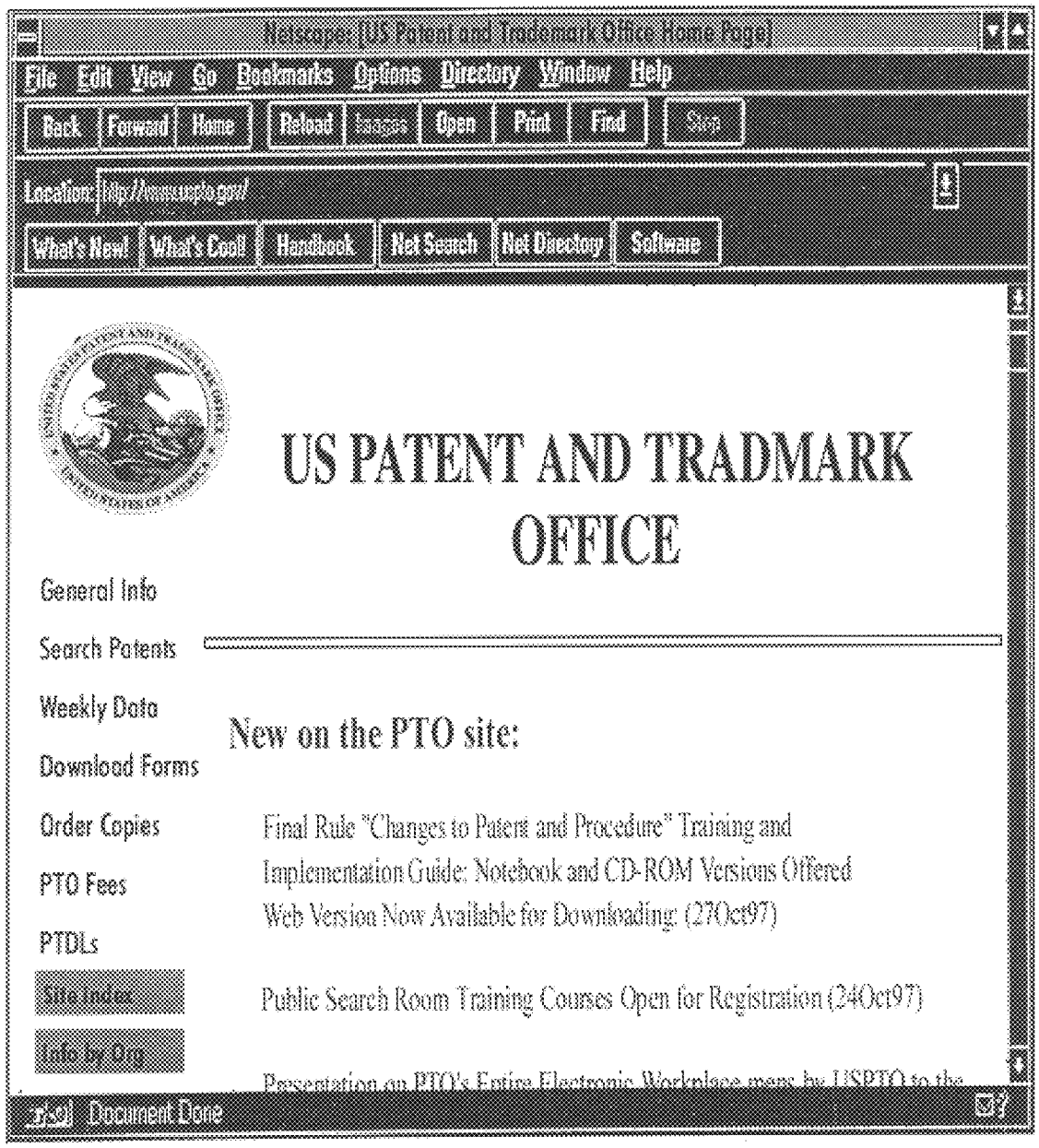
FIG. 3 is a representative graphical user interface illustrating a Web browser displaying a Web page.
Figure 4:
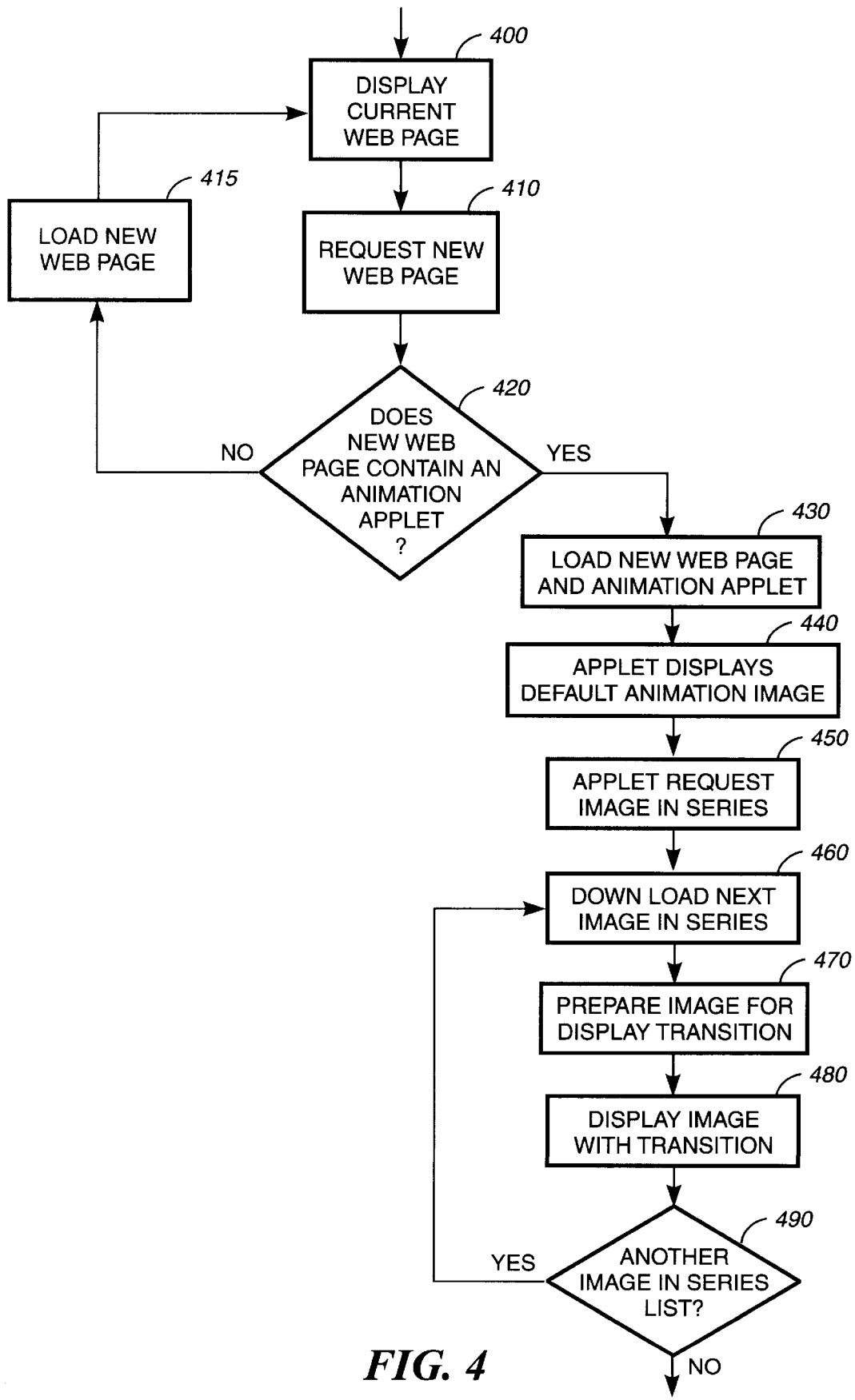
FIG. 4 is a flowchart of the present invention.

Referring now to FIG. 3. is an illustration of a typical Web page in HTML formate for the United State Patent and Trade Office rendered on browser 62 of computer client 10. The preferred operation of the present invention is illustrated in FIG. 4. The method begins with the display of a current Web page 400. A user selects a hyper link to new Web page 410. Upon loading, the new Web page may or may not contain a Java animation image applet 420. If the new Web page does not contain a Java animation image applet according to the present invention, the new Web page 415 loads normally as known in the prior art. When the new page contains a Java animation applet according to the present invention, the new Web page, Java animation applet and the default Java animation image are all loaded 430.

Upon completion of loading new Web page, Java animation applet and the default Java animation image 430, Java animation image applet displays the default animation image 440. The file size of the default animation image combined with the Java animation image applet are kept small so that the corresponding total time to load the Web page, the Java animation applet and the default Java animation image 430 is kept to a minimum. The size of the Java animation image applet and the default image are typically 10,000 bytes that is smaller than the size of a single GIF image file type. A single GIF image file size is in the range from 15,000 bytes to 60,000 bytes. It is important to note that each Web page can have multiple image or GIF files so the savings in download time is greater the higher the number of images contained on the Web page.

Figure 5:
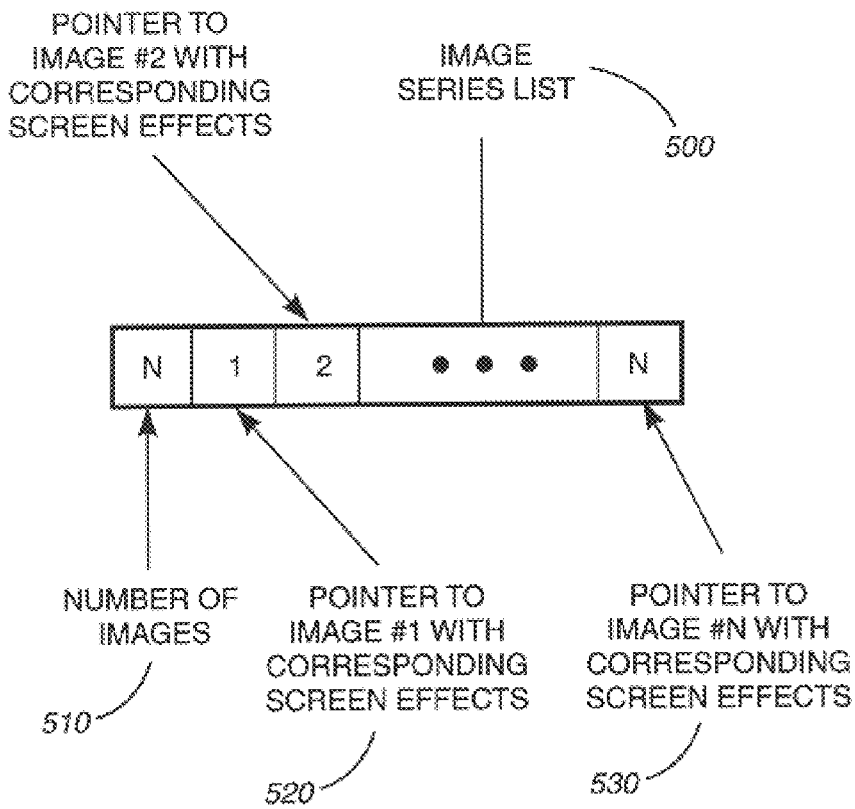
FIG. 5 is a block diagram of an image series list according to the present invention.
Figure 6:
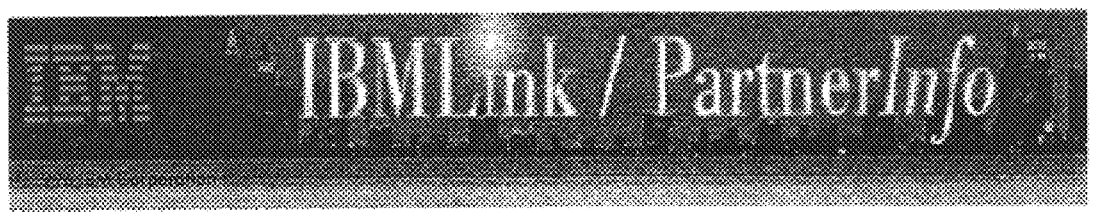
FIG. 6 is a representative graphical user interface illustrating a Java animation applet with the corresponding default image according to the present invention.
Figure 6:
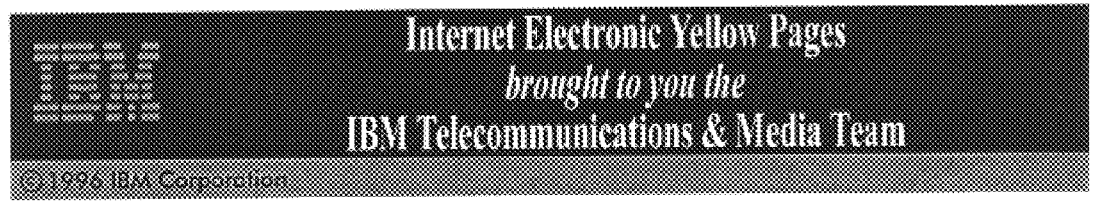
Figure 7:
FIG. 7 is representation of screen transition effects according to the present invention.

Once the Web page, associated Java applet with the default image are loaded and displayed 440 the Java animation applet makes a HTTP (Hyper Text Transfer Protocol) request for an image series list 450 from the Web server 10. The series image list 460 is a list of related images to be delivered to Java animation applet. FIG. 5 is a block diagram of an image series list 500. The number of images 510 to be employed by the Java animation applet begins the image series list 500. Each subsequent entry in the image series list 500 represents a pointer to a graphical image with the associated screen transition effects. The pointer to the graphical image can point to images and their associated screen transition stored on the same web server as image series list or to another location on the network.

Returning to FIG. 4, a first image in series list 460 is downloaded to Java animation application 470. Once finished downloading the image, Java animation applet prepares the image for display using screen transition effects between the downloading of each subsequent image in image series list 10. The speed of the screen transition effect is such that the next subsequent image is just finished being downloaded and prepared for viewing. This creates a psycho-visual perception to the user of not waiting for additional information to download in the background. The screen transition effects can be any of a wide variety of known screen animation for moving between a current image and a subsequent image. Screen transition effects includes:

i. Adam Seven Interlace—to display the subsequent image one pixel at a time, in complex interlace order;
ii. Horizontal Split—the subsequent image will appear in two sections, with half rolling in from the left of the current viewing window and half rolling half in from the right of the current viewing window;
iii. Sandstorm—the subsequent image will appear one pixel at a time, in random order;
iv. Tile—the subsequent image will appear in small squares, in random order;
v. Vertical Split—the subsequent image will appear in two sections, with half rolling in from the bottom of the current viewing window and the other half rolling in from the top of the current viewing window;
vi. Wipe in From Bottom—the subsequent image will roll in from the bottom of the current viewing window;
vii. Wipe in From Left—the subsequent image will roll in from the left side of current viewing window;
viii. Wipe in From Right—the subsequent image will roll in from the right side of current viewing window; and
ix. Wipe in From Top—the subsequent image will roll in from the top of current viewing window.

The Java animation applet does not interfere with any of the other information loaded with the Web page. The sequence of downloading a series of images by the Java applet in the background is not perceivable by the Web browser user.

In another embodiment, one instance of the Java animation applet can accommodate a Web page consisting of one or more images. Using one Java animation applet for one or more images on a Web page greatly reduces the network transmission requirements by eliminating the need to send multiple copies of the Java animation applet. To accomplish this coterminous multiple image handling, the Java animation applet is written to be reentrant so that each image on a Web page executes in its own parameter space on Web browser 62.

In yet another embodiment, computer clients 12 include a mouse pointer to the web browser for selecting hyper links. Java animation applet upon selection by the user can launch a separate browser window displaying information related the images displayed on Java animation applet. Relations to the images displayed in the separate browser window include advertisement, ordering information and coupons linked to the images displayed by the Java animation applet.

While the invention has been illustrated and described in the preferred embodiments, many modifications and changes therein may be affected by those skilled in the art. It is to be understood that the invention is not limited to the precise construction herein disclosed. Accordingly, the right is reserved to all changes and modifications coming within the true spirit and scope of the invention.

We claim:

1. An information processing system comprising:
    a browser for retrieving hypertext objects from servers over a network, wherein said network has a limited bandwidth associated therewith;
    said browser including a Java engine for running Java applets;
    a hypertext means responsive to activation of a hypertext link, for retrieving from said server a hypertext object containing a Java applet,
    said Java applet loading an animation applet from said server having a default image and default image animation effects for display on said browser; and
    said Java applet requesting a target image series comprising a series of related images from said server and loading said target image series one image at a time with screen transition effects in between each image so that a speed of said screen transition effects is set to finish when a next image in said image series is retrieved over said network of limited bandwidth and prepared for loading by said Java applet, thereby making said speed of said screen transition effects proportional to a time required to retrieved said next image in said image series.

2. The information processing system of claim 1 wherein said screen transition effects is selected from a group consisting of fades, dissolves, vertical shutters, horizontal shutters.

3. The information processing system of claim 1 further comprising a mouse pointer wherein a user may selectively click on said animation applet so as to cause a new browser window to be launched displaying informational content related to said animation applet.

4. The information processing system of claim 1 further comprising:

said browser for retrieving hypertext objects from servers over a network; said browsers including a Java engine for running Java applets and said browser supporting separate HTML frames for displaying images.

5. The information processing system of claim 1 further comprising:

said Java applet being reentrant so as to support coterminous animation effects for one or more images displayed on said browser.

6. A method for loading multiple animated images comprising the steps of:

retrieving hypertext objects containing a Java applet from servers over a network with a limited bandwidth associated therewith, into a browser utilizing a Java engine for running Java applets;

displaying a default image and default image effects by said Java applet; and said Java applet retrieving a target image series comprising a series of related images from said server and loading said target image series one image at a time with screen transition effects in between each image so that a speed of said screen transition effects is set to finish when a next image in said image series is retrieved over said network of limited bandwidth and prepared for loading by said Java applet, thereby making said speed of said screen transition effects proportional to a time required to retrieved said next image in said image series.

7. The method for loading multiple animated images in claim 6 wherein said screen transition effects is selected from a group consisting of fades, dissolves, vertical shutters, horizontal shutters.

8. The method for loading multiple animated images in claim 6 wherein a user may selectively click on said animation applet so as to cause a new browser window to be launched displaying informational content related to said animation applet.

9. The method for loading multiple animated images in claim 6 wherein said browser utilizing a Java engine for running Java applets, said browser supporting separate HTML frames for displaying images.

10. The method for loading multiple animated image in claim 6 wherein said Java applet being reentrant so as to support coterminous animation effects for one or more images displayed on said browser.

11. A computer-readable storage medium containing instructions for loading multiple animated images by:

program instruction means for retrieving hypertext objects containing a Java applet from servers over a network with a limited bandwidth associated therewith, into a browser utilizing a Java engine for running Java applets;

said Java applet contain a first program instruction means for displaying a default image and default image effects by said Java applet; and said Java applet contain a second program instruction means for retrieving a target image series comprising a series of related images from said server and loading said target image series one image at a time with screen transition effects in between each image so that a speed of said screen transition effects is set to finish when a next image in said image series is retrieved over said network of limited bandwidth and prepared for loading by said Java applet, thereby making said speed of said screen transition effects proportional to a time required to retrieved said next image in said image series.

12. The computer-readable storage medium of claim 11 containing instructions for loading multiple animated images wherein said screen transition effects is selected from a group consisting of fades, dissolves, vertical shutters, horizontal shutters.

13. The computer-readable storage medium of claim 11 containing instructions for loading multiple animated images wherein a user may selectively click on said animation applet so as to cause a new browser window to be launched displaying informational content related to said animation applet.

14. The computer-readable storage medium of claim 11 containing instructions for loading multiple animated images wherein said browser utilizing a Java engine for running Java applets, said browser supporting separate HTML frames for displaying images.

15. The computer-readable storage medium of claim 11 containing instructions for loading multiple animated images wherein said Java applet being reentrant so as to support coterminous animation effects for one or more images displayed on said browser.

* * * * *